July 27, 1965  N. J. SMITH  3,196,688
BLEEDER MEANS FOR GAUGES
Filed Feb. 20, 1962

INVENTOR:
NORMAN J. SMITH
BY Howson & Howson
ATTYS.

3,196,688
BLEEDER MEANS FOR GAUGES
Norman J. Smith, Churchville, Pa., assignor to J. E. Lonergan Company, Philadelphia, Pa., a corporation of Pennsylvania
Filed Feb. 20, 1962, Ser. No. 174,540
1 Claim. (Cl. 73—418)

The present invention relates to new and useful improvements in measuring instruments, for example, pressure gauges of the Bourdon tube type. More particularly the present invention relates to new and improved bleeder means for bleeding the Bourdon tube of a gauge used to measure the pressure of a liquid.

An object of the present invention is to provide bleeder means for gauges of the above type wherein liquid may be bled from the Bourdon tube to permit entrapped air bubbles and foreign matter to escape from the Bourdon tube without disassembling parts of the gauge and which does not interfere with normal operation of the gauge.

Another object of the present invention is to provide bleeder means having novel features of construction and arrangement whereby the tube may be bled from the exterior of the gauge and wherein liquid is prevented from seeping into the interior of the gauge and possibly affecting normal operation of the mechanism of the gauge.

A further object of the present invention is to provide bleeder means which effectively bleeds the Bourdon tube and which during normal operation of the gauge prevents leakage of liquid from the tube which might otherwise affect accuracy of the gauge.

A still further object of the present invention is to provide bleeder means of comparatively simplified construction which is adapted for use readily with various types of commercially known measuring instruments.

Other objects of the present invention and the various features and details of the operation and construction thereof are set forth more fully hereinafter with reference to the accompanying drawing, in which.

Figure 1:
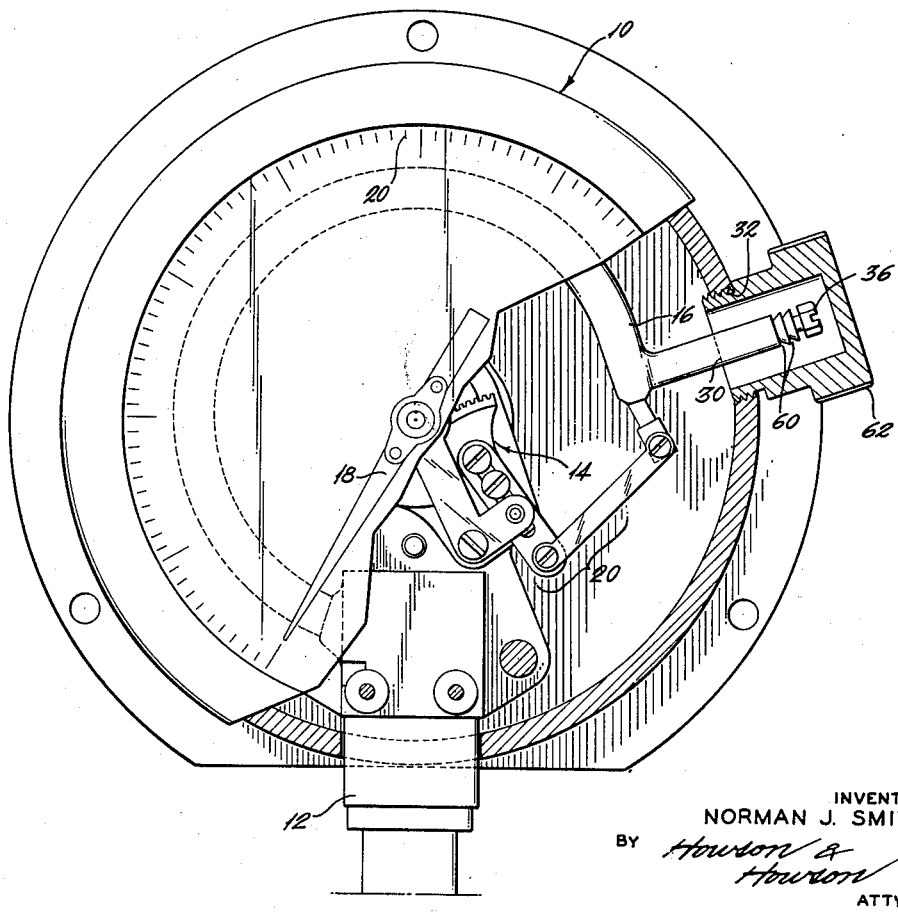
FIG. 1 is a front elevational view of a pressure gauge embodying bleeder means in accordance with the present invention with parts broken away to show some of the structural details of the gauge.

Referring now to the drawing, FIG. 1 shows a pressure gauge of generally conventional form embodying bleeder means in accordance with the present invention. The gauge includes a generally cylindrical housing 10 having a tubular nipple 12 depending therefrom through which variations in liquid pressure are transmitted to a gauge movement generally designated by the numeral 14. The gauge movement 14 includes a Bourdon tube 16 which is connected at one end to the nipple 12 and which at its opposite end is closed and is connected to a pointer or indicating needle 18. As is conventional, variations in liquid pressure in the Bourdon tube cause flexing displacement of the Bourdon tube to effect through conventional linkage 20 rotation of the indicating needle 18 with respect to a graduated dial plate 20 to give a reading of the pressure being measured.

Figure 2:
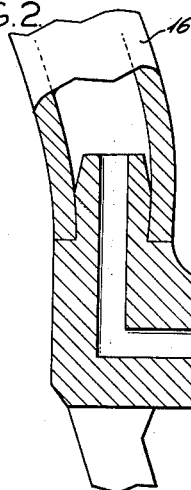
FIG. 2 is an enlarged view partially in section of bleeder means in accordance with the present invention disposed to prevent escape of liquid from the Bourdon tube.
Figure 3:
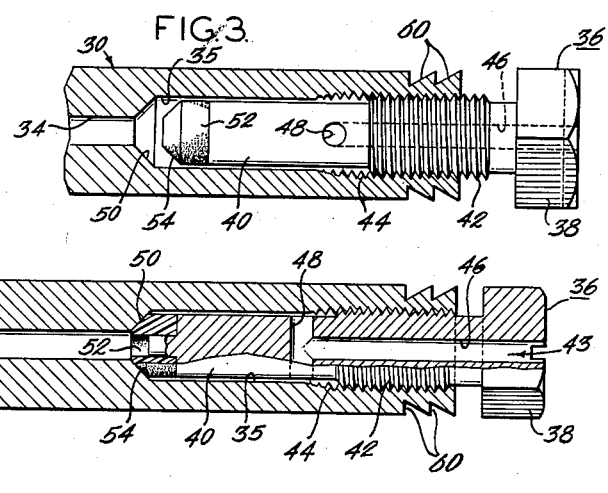
FIG. 3 is an enlarged sectional view of the bleeder means disposed to permit bleeding of liquid from the Bourdon tube.

In accordance with the present invention, bleeder means is provided having novel features of construction and arrangement whereby liquid may be bled from the Bourdon tube exteriorly of the gauge without disassembling parts of the gauge or affecting normal operation thereof. To this end, the bleeder means includes an elongated tubular arm 30 projecting outwardly from the closed end of the Bourdon tube through an enlarged opening 32 in the side wall of the housing. As illustrated the bore in the arm 30 is of a comparatively small cross section as at 34 adjacent the inner end thereof which is in fluid communication with the Bourdon tube 16 and is of a greater cross section adjacent the free end of the arm to provide a chamber 35. A bleeder plug is mounted in the chamber 35 and is movable axially therein between an inner position shown in FIG. 2 sealing the Bourdon tube against escape of liquid and an outer bleeding position shown in FIG. 3 permitting bleeding of the liquid from the Bourdon tube.

In the present instance the bleeder plug is in the form of a screw 36 having an enlarged head 38 and a shank 40 depending therefrom which has external screw threads 42 extending for a portion of the axial length of the shank which engage with internal screw threads 44 adjacent the outer end of the arm 30 to permit axial movement of the bleeder screw 36 between inner and outer positions. A passageway 43 is provided in the bleeder screw to permit passage of liquid therethrough which as illustrated comprises an axial section 46 extending from the head 38 to a point beyond the threads 42 where it intersects a radial section 48 extending through the shank of the bleeder screw 36. Accordingly when the bleeder screw 36 is disposed in the bleeding position shown in FIG. 3, liquid is free to flow from the Bourdon tube through the annular clearance between the shank 40 and the chamber 35 to the passageway 43 and out through the end of the bleeder screw. By this arrangement it is apparent that liquid may be bled from the tube exteriorly of the housing to permit escape of foreign matter and entrapped air bubbles in the tube without disassembling parts of the gauge.

Leakage of liquid from the Bourdon tube is precluded during normal operation of the tube when the bleeder screw 36 is in the inner or sealing position. To this end, the chamber 35 merges with the bore section 34 in a conical shoulder 50 and the bleeder screw 36 is provided with a sealing element 52 mounted on the tip thereof which is chamfered as at 54 to seat on the shoulder 50 and provide a surface to surface contact therebetween. The sealing element 52 is preferably made of a resilient, plastic material, for example, polytetrafluoroethylene (sold under the trade name "Teflon" by the E. I. du Pont de Nemours and Company). This material is substantially inert thereby resisting deterioration when contacted by the liquid in the gauge and is sufficiently resilient whereby an effective seal is provided when the sealing element is seated snugly against the shoulder 50 thereby preventing leakage of liquid from the Bourdon tube. It is noted that during operation of the gauge with the bleeder screw 36 in the inner sealing position, the enlarged opening 32 in the housing permits unobstructed movement of the arm 30 as a result of normal flexing displacement of the Bourdon tube whereby accuracy of the gauge is assured. Further, the opening 32 is threaded to receive a cap 62 which covers the bleeder means and protects the same against tampering and engagement which might hinder normal operation of the gauge.

Another feature of the present invention is the provision of means preventing possible undesirable accumulation of liquid interiorly of the gauge housing during bleeding of the Bourdon tube 16. To this end a series of circumferentially extending, axially spaced undercuts forming serrations 60 is provided in the outer peripheral surface of the arm 30 adjacent the free end thereof. As shown in FIG. 1, the serrated portion of the arm 30 is disposed exteriorly of the housing. By this arrangement any liquid tending to leak through the meshing threads 42 and 44 and return into the housing along the outer surface of the arm 30 is prevented by the serrations 60 which interrupt flow of the liquid and cause it to drip therefrom exteriorly of the gauge housing. It is noted that the undercuts are of a sufficient depth to disrupt flow of the liquid along the arm in the manner indicated.

The gauge is initially installed in a system to measure pressure of liquid therein with the bleeder screw 36 in the inner position wherein the sealing element 52 abuts the shoulder 50. Thereafter the bleeder screw 36 is threaded outwardly to the outer position shown in FIG. 3 in order to bleed any air from the Bourdon tube which would affect accuracy of the gauge. The head of the bleeder screw is polygonally shaped and has a slot therein to facilitate turning of the screw by a wrench or screwdriver. In the bleeding position the resilient sealing element 52 is spaced from the shoulder 50 (see FIG. 3) and liquid in the Bourdon tube is free to flow in the clearance between the shank 40 and the wall of chamber 35 to pass through the passageway 43 exteriorly of the gauge housing. It is noted that in this position, liquid which might seep through the meshing threads 42 and 44 and along the outer periphery of the arm to the interior of the gauge is arrested by the serrations 60 and drips harmlessly exteriorly of the gauge. When the Bourdon tube has been bled, the bleeder screw 36 is turned inwardly to a sealing position to reseat the sealing element 52 against the shoulder 50 and prevent escape of liquid from the Bourdon tube during operation of the gauge. As noted the enlarged opening 32 in the side wall of the housing permits unobstructed movement of the arm 30 during normal flexible movements of the Bourdon tube 16 whereby accuracy of the gauge is assured. Additionally as noted above, the cap 62 covers the bleeder screw 36 to minimize tampering therewith during operation of the gauge and also to prevent engagement thereof which might hinder normal movement of the Bourdon tube.

From the foregoing it is readily apparent that the present invention provides novel bleeder means for a Bourdon type gauge whereby the gauge may be bled without dismantling parts of the gauge and whereby the liquid is directed exteriorly of the gauge. The bleeder means is of simplified construction and may be adapted to commercially known gauges easily and economically.

While a particular embodiment of the present invention has been illustrated herein, it is not intended to limit the invention to such disclosure and changes and modifications may be made therein and thereto within the scope of the following claim.

I claim:

In a gauge, a housing, a gauge movement including a Bourdon tube mounted in said housing, bleeder means for bleeding a liquid from said Bourdon tube comprising an elongated tubular stationary arm having one end in fluid communication with said Bourdon tube and the free opposite end disposed exteriorly of the housing, said arm having a first bore section of comparatively small cross section adjacent said one end and a second bore section of greater cross section adjacent said free end to provide a cylindrical chamber, said first and second bore sections merging in a conical shoulder, said second bore section being threaded for a portion of its length adjacent its free end, a bleeder plug including an elongated shank portion having a tip at one end and external screw threads for a portion of its length opposite said tip end to threadedly engage with the threads in said second bore section, said unthreaded shank portion being of smaller cross section than said second bore section to provide a clearance therebetween, a sealing element made of a resilient, plastic material mounted on said tip of the bleeder plug having a chamfered peripheral edge adapted to abut said conical shoulder, means defining a passage extending through said plug including a radial section extending through said shank at a point beyond the external screw threads and an axial section extending from the radial section to the end opposite the tip, said bleeder plug adapted for axial movement in said chamber between an inner limit position wherein the tip of the bleeder plug abuts said conical shoulder closing communication between said Bourdon tube and said passageway thereby preventing flow of liquid from said Bourdon tube and an outer position in said arm wherein said tip is spaced from said conical shoulder opening communication between said Bourdon tube and said passageway thereby permitting flow of liquid from said Bourdon tube through said passageway exteriorly of the housing, at least one circumferentially extending undercut in the outer peripheral surface of said arm adjacent the free end thereof exteriorly of the housing, said undercut having a conical inwardly converging surface forming a serration adapted to interrupt flow of liquid along said arm and cause it to drip exteriorly of the housing.

References Cited by the Examiner

UNITED STATES PATENTS

| 348,414 | 8/86 | Rae | 73—411 X |
|---|---|---|---|
| 543,008 | 7/95 | Gale | 251—351 X |
| 1,322,463 | 11/19 | Nelson | 73—411 |
| 1,451,025 | 4/23 | Kraft | 251—347 |
| 2,656,723 | 10/53 | Heise | 73—418 |
| 2,796,205 | 6/57 | Kuzma | 222—571 X |
| 2,839,230 | 6/58 | Pottle | 222—571 |
| 2,865,596 | 12/58 | Monnig | 251—346 |
| 2,936,777 | 5/60 | Kistner | 251—333 X |

OTHER REFERENCES

Publication: "Heise Gauges," Heise Bourdon Tube Co., Inc. (Copyright 1953, (pages 5 and 10 relied on).)

Publication: Seegers Standards Precision Test Gauges (1960), page 10.

RICHARD C. QUEISSER, *Primary Examiner.*